May 11, 1948.  G. V. SZABO  2,441,453
DEVICE FOR MOUNTING LOUPES ON SPECTACLES
Filed Jan. 25, 1945
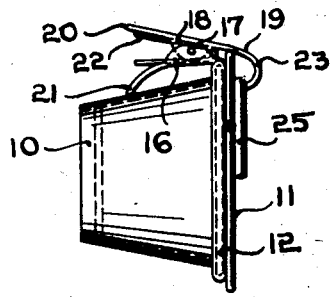
Fig. 1.
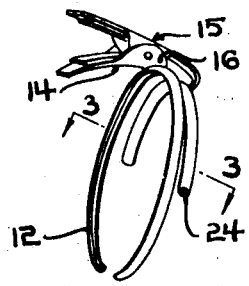
Fig. 2.
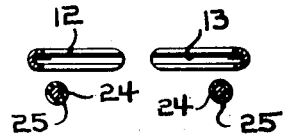
Fig. 3.
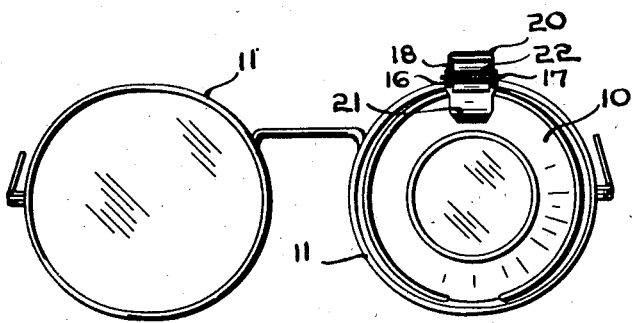
Fig. 4.
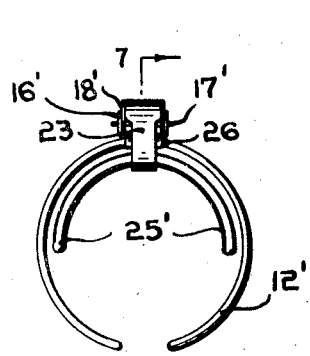
Fig. 6.
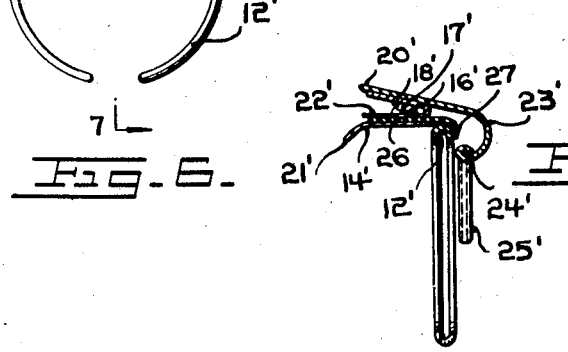
Fig. 5.
Fig. 7.
INVENTOR.
Gustav V. Szabo
BY
*[signature]*
ATTORNEY.

Patented May 11, 1948

2,441,453

UNITED STATES PATENT OFFICE 2,441,453

DEVICE FOR MOUNTING LOUPES ON SPECTACLES

Gustav V. Szabo, Peekskill, N. Y.

Application January 25, 1945, Serial No. 574,581

1 Claim. (Cl. 88—41)

This invention relates to new and useful improvements in a device for mounting a loupe on a pair of spectacles.

More specifically, the present invention proposes the construction of a device for mounting a loupe such as is employed by a jeweler, watchmaker or stamp collector on a pair of spectacles, the device being characterized by being devised to immediately fit a variety of different size loupes and spectacles and having means protecting the lenses of the spectacles.

Still further, it is proposed to provide a device as aforesaid wherein means is provided so that the device with a loupe attached may be assembled and disassembled with a pair of spectacles being worn by a person without removing the spectacles, and further by the employment of one hand only of the person, leaving the other hand free for other operations.

Another object is to provide a device as aforesaid having rubber guards for protecting the lenses of the spectacles, at least one of the guards being spring-held in place.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side view of a device constructed in accordance with this invention and of a loupe attached thereto, a spectacle lens also being shown in section.

Fig. 2 is a perspective view of the device.

Fig. 3 is an enlarged section on the line 3—3 of Fig. 2.

Fig. 4 is a front view of the structure shown in Fig. 1.

Fig. 5 is a plan view of the structure shown in Fig. 1.

Fig. 6 is a front view of a device constructed in accordance with a modification of this invention.

Fig. 7 is a section on the line 7—7 of Fig. 6.

The present invention is directed to providing a device or holder for holding a loupe against the lens of a pair of spectacles in such a way that it may be quickly removed from and returned to the spectacles without any danger of scratching the spectacles or damaging the device, the device being operable by one hand for attachment to and removal from the spectacles. Furthermore the device is devised to firmly hold the loupe to the spectacles and can be used with various sizes and shapes of loupes and with various sizes of spectacle lenses. The device is also adapted to hold the loupe in perfect focus with the spectacle lens, and the loupe may be quickly assembled with and removed from the device without the need of tools, screws or other means. Other characteristics of the device will be brought forth in the following description of the embodiments shown in the drawing.

The device, according to the present invention, is for mounting a loupe 10 on the lens 11 of a pair of spectacles. The device comprises a split ring 12 forming almost a complete circle. Split ring 12 is made of flexible springy metal and has an internal groove 13 which is adapted to engage the circular edge of the large end of the loupe 10. Due to the split of ring 12, it may be expanded to fit around various sizes of loupes, the ring 12 having enough spring action to always return to original shape when the loupe is removed and to always firmly grip any loupe attached thereto.

Split ring 12 is secured, as by soldering or welding, to the front end of a bottom member 14 of a clamp 15, the soldering being at a point on the ring diametrically opposite to the split. Member 14 has upstanding lugs 16 pivotally connected by a pin 17 to coacting lugs 18 of a top member 19 of the clamp. Both the top and bottom members extend rearwardly from the lugs providing a top handle portion 20 and a bottom abutment portion 21 respectively. When the device is attached to the loupe, the abutment portion 21 engages the top of the loupe and forms a brace as will presently appear. Portion 21 can be quickly manually bent to fit various shapes of loupes used with the device.

A U-shaped flat spring 22 is disposed between the members, forcing the handle and abutment portions apart.

The forward end of the top member extends forward beyond the forward end of the bottom member and ring 12 and then curves back, forming a U-shaped portion 23. A curved piece of round wire is secured as by soldering or welding to the bottom rear end of portion 23, the wire being so secured at its middle providing two curved legs 24 extending from the portion 23 on opposite sides thereof. Legs 24 are of smaller radius than ring 12 and each leg is covered by a tubular piece of rubber 25. The legs 24, taken together, are less than 180 degrees in length.

The operation of the device is as follows:

Assuming a person such as a watchmaker wearing a pair of spectacles needs to use a loupe, he may choose any of several loupes, disregarding size and shape, and quickly secures the loupe in the device by merely forcing the ring 12 open until it receives the large circular edge of the loupe in the groove 13. Then with one hand, he can depress handle portion 20, which moves legs 24 away from ring 12, abutment portion 21 simultaneously bracing against the top of the wall, and slip the device over a lens of his spectacles, the legs 24 being on the inside of the lens and the ring 12 on the outside. Upon release of handle 20 the lens will be squeezed between the legs 24 and the ring 12, firmly mounting the loupe on the lens. The rubber covering 25 of the legs will protect the lens from scratching. The curved portion 23 insures a firm engagement of the lens by the legs 24. Legs 24 are in a plane parallel with the plane of ring 12.

The device shown in Figs. 6–7, constructed in accordance with a modification of this invention, distinguishes from the device of Fig. 1 in that a rubber pad 26 is spring pressed into engagement with the upper surface of member 14' by the bottom leg of spring 22', this pad extending forwards to the ring 12' and having a curved front end 27 covering the front end of member 14' and the front face of ring 12' at the top thereof. Other parts of this device corresponding to similar parts of the device of Figs. 1–5 are indicated by like references with an accent added.

When the loupe is attached to the ring 12' and the device is mounted on the lens of a spectacle, the point of greatest pressure on the lens, that is, the point on the lens which is most likely to be fractured by the device, is between the top of the ring 12' and the adjacent portion of the legs 24'. The rubber covering of the legs 24' protects the lens on the forward side thereof and the front end of 27 of the rubber pad 26 protects the lens on the rear side thereof. Thus no metal parts come in contact with the lens to scratch it and the rubber has enough flexibility to prevent the force exerted by the spring 22' from damaging the lens.

The pad 26, being spring held by the bottom leg of the spring 22', may be easily removed and replaced when necessary by merely compressing the spring 22' with a pair of tweezers or pliers.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention what I claim as new, and desire to secure by United States Letters Patent is:

A device for mounting a loupe on a pair of spectacles comprising a clamp having hinged top and bottom members, a spring forcing the rear ends of said members apart and the front end of said members together, the rear end of said top member forming a handle for operating said clamp and the rear end of said bottom member abutting said loupe when said handle is being operated and said loupe is assembled with said device, a split ring secured to the front end of said bottom member, and curved legs secured to the front end of said top member forwardly of and in a plane parallel to said split ring, said groove forming means for mounting said loupe in said device and said split ring and said curved legs forming a clamp for gripping a lens of said spectacles, said bottom member rear end being adjustable whereby various shape loupes may be accommodated in said split ring.

GUSTAV V. SZABO.

REFERENCES CITED

The following references are of record in the file of this patent:

UNITED STATES PATENTS

| Number | Name | Date |
| --- | --- | --- |
| 1,272,911 | Buckminster | July 16, 1918 |
| 1,641,834 | Wrighton | Sept. 6, 1927 |
| 2,369,761 | Stegeman | Feb. 20, 1945 |